US008356276B2

(12) United States Patent
Bender (10) Patent No.: US 8,356,276 B2
(45) Date of Patent: *Jan. 15, 2013

(54) FLEXIBLE CODE GENERATION

(75) Inventor: Joachim Bender, Weiheim (DE)

(73) Assignee: SAP AG, Walldorf (DE)

( * ) Notice: Subject to any disclaimer, the term of this patent is extended or adjusted under 35 U.S.C. 154(b) by 461 days.

This patent is subject to a terminal disclaimer.

(21) Appl. No.: 12/631,687

(22) Filed: Dec. 4, 2009

(65) Prior Publication Data

US 2010/0083218 A1 Apr. 1, 2010

Related U.S. Application Data

(63) Continuation of application No. 10/756,720, filed on Jan. 13, 2004, now Pat. No. 7,650,590.

(51) Int. Cl.
G06F 9/44 (2006.01)

(52) U.S. Cl. .................. 717/106; 717/115; 717/117

(58) Field of Classification Search ........... 717/104–117
See application file for complete search history.

(56) References Cited

U.S. PATENT DOCUMENTS

| | | | |
|---|---|---|---|
| 5,699,310 A | 12/1997 | Garloff et al. | |
| 6,263,358 B1 | 7/2001 | Lee et al. | |
| 6,266,805 B1 | 7/2001 | Nwana et al. | |
| 6,314,555 B1 | 11/2001 | Ndumu et al. | |
| 6,324,576 B1 | 11/2001 | Newcombe et al. | |
| 6,502,234 B1 | 12/2002 | Gauthier et al. | |
| 6,578,191 B1 | 6/2003 | Boehme et al. | |
| 6,601,233 B1 | 7/2003 | Underwood | |
| 6,701,381 B2 | 3/2004 | Hearne et al. | |
| 6,973,640 B2 | 12/2005 | Little et al. | |
| 6,993,759 B2 | 1/2006 | Aptus et al. | |
| 7,000,218 B2 | 2/2006 | Gerken | |
| 7,047,518 B2 | 5/2006 | Little et al. | |
| 7,114,146 B2 | 9/2006 | Zhang et al. | |
| 7,213,227 B2 | 5/2007 | Kompalli et al. | |
| 7,225,425 B2 | 5/2007 | Kompalli et al. | |
| 7,237,225 B2 | 6/2007 | Kompalli et al. | |
| 7,263,686 B2 | 8/2007 | Sadiq | |
| 7,650,590 B2 * | 1/2010 | Bender | 717/106 |

OTHER PUBLICATIONS

IBM, Adapter for mySAP.com (SAP R/V V.3.x) User Guide, Apr. 2003, IBM Corporation, pp. 1-271.

Mark Abrams and Constantinos Phanouriou, "UIML: An XML Language for Building Device-Independent User Interfaces," Dec. 1999, retrieved from the Internet on May 17, 2004, at http://www.harmonia.com/resources/papers/xml99Final.pdf, XP002280477, 15 pgs.

Mark Abrams and Jim Helms, "User Interface Markup Language (UIML) Specification, Version 3.0," Feb. 8, 2002. Harmonia, Inc., retrieved from the Internet on May 18, 2002, at http://www.uiml.org/specs/docs/uiml30-revised02-12-02.pdf, XP002280679, 116 pgs.

(Continued)

Primary Examiner — Ted T Vo
(74) Attorney, Agent, or Firm — Fountainhead Law Group PC (57) ABSTRACT

There are methods and apparatus, including computer program products, for a flexible generation framework. The generation framework encapsulates a variety of different code generation technologies within a common interface. This allows various types of generator cores operating in various development environments to be integrated into the framework, and enables the generation of code using various generating technologies.

14 Claims, 4 Drawing Sheets

OTHER PUBLICATIONS

Mir Farooq, Manuel A. Perez-Quinones, Eric Shell and Mark Abrams, "Building Multi-Platform User Interfaces with UIML," Nov. 9, 2001, retrieved from the Internet on May 17, 2004, at http://www.arxiv.org/ftp/cs/papers/0111/0111024.pdf, XP002280476, XP002280477, XP002280490, 12 pgs.

Computer Science, Abstract, Arxiv.org E-Print Archive, retrieved from the Internet on May 17, 2004, at http://arxiv.org/abs/cs.HC/0111024, XP002280478, 1 pg.

Kurt Kagle, et al., "Professional XSL," 2001, Wrox Press Ltd., Arden House, Birmingham, UK, XP002281359, p. 742.

John R. Levine, "Linkers & Loaders," 2000, Morgan Kaufmann Publishers, San Francisco, CA, XP002283283, p. 48.

Constantinos Phanouriou, "UIML: A Device-Independent User Interface Markup Language," Virginia Polytechnic Institute and State University, Sep. 26, 2000, retrieved from the Internet on May 17, 2004, at http://scholar.lib.vt.edu/theses/available/etd-08122000-19510051/unrestricted/PhanouriouETD.pdf, XP002280491, 172 pgs.

Constantinos Phanouriou, "User Interface Markup Language (UIML) Draft Specification, Version 2.0a," Jan. 17, 2000, retrieved from the Internet on May 17, 2004, at http://www.uiml.org/specs/docs/uiml20-17Jan00.pdf, XP002280490, 64 pgs.

Karl Kessler, "SAP's Infrastructure for Java Development: An Overview," 2002, The SAP TechEd '02 New Orleans Team, pp. 1-30.

Axel Angeli, "How to Develop Web Services in WebAS," 2003, Klee Associates, Inc., pp. Part 1: 1-16, part 2: 1-27.

\* cited by examiner

FLEXIBLE CODE GENERATION

CROSS REFERENCE TO RELATED APPLICATIONS

This invention is a continuation of and claims the benefit of priority from U.S. patent application Ser. No. 10/756,720, filed Jan. 13, 2004, entitled "Flexible Code Generation."

RESERVATION OF COPYRIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates to data processing by digital computer, and more particularly to application development.

In attempting to simplify the development of software applications, some companies have developed declarative programming platforms. Such platforms allow an application developer to develop an application by declaring what should be in the application and how the application should appear to the user, instead of writing software code in a particular language. The declarations can be specified using tools that, for example, represent available selections graphically and allow the developer to simply choose items to develop an application. Other techniques can also be used to specify declarations, but regardless of the technique that is used, the goal is that the developer should not produce an application by writing code in a particular programming language. Instead, a generator produces the actual code. The generator takes the developer's declarative data (e.g., metadata) and generates application code in specific output files that can be used in a particular runtime environment.

SUMMARY OF THE INVENTION

The description describes methods and apparatus, including computer program products, for implementing a flexible generation framework. The generation framework encapsulates a variety of different code generation technologies within a common interface. This allows various types of generator cores operating in various development environments to be integrated into the framework, and enables the generation of code using various generating technologies.

In one aspect, there is a method for flexible code generation. The method includes providing a common interface to a plurality of different types of generator cores corresponding to different systems and operating in different development environments. The method also includes receiving a request to generate software code from one of the generator cores operating in one of the development environments and determining a generation task associated with the request, where the generation task corresponds to one of a plurality of different generation technologies. The method also includes generating the software code using the generation task.

The method can be implemented to include one or more of the following advantageous features. The method includes defining parameters used for the generation task using a configuration file. The generation tasks are associated with a template or a class. One of the different systems is associated with a Web Dynpro system, a data dictionary system, or a common model system. One of the development environments is associated with an Eclipse IDE, an ANT environment, or a console environment. One of the generation technologies is associated with Velocity, XSLT, or a Java class.

In another aspect, there is a method that includes receiving a request to generate code for an application element, where the request includes a reference to a generation unit and one or more context values associated with the generation unit. The method also includes determining a generation task corresponding to the generation unit, generating a call appropriate for a generation technology corresponding to the generation task, and generating the code using the one or more context values.

The method can be implemented to include one or more of the following advantageous features. Determining the generation task includes reading a configuration. The method includes passing back the generated code to an entity making the request. The method includes determining whether declarative data representing the application element is valid. The method includes determining whether generated code is needed. The method includes determining whether generating the code is successful. The method includes invoking the generation task, using the one or more context values.

In another aspect, there is a computer program product, tangibly embodied in an information carrier, for a generation framework, where the computer program product includes instructions operable to cause data processing apparatus to perform any of the methods or features described above.

In another aspect, there is a generation framework that includes an interface module, a selection module, and an invocation module. The interface module is configured to accept input from a plurality of different types of generator cores, where each type is associated with particular generation units. The selection module is in communication with the interface module. The selection module is configured to select a generation task from a plurality of different generation tasks based on one of the particular generation units associated with a generator core requesting generation of software code for a particular application element. The invocation module is in communication with the selection module. The invocation module is configured to invoke the selected generation task using a generation technology associated with the selected generation task.

The generation framework can be implemented to include one or more of the following advantageous features. The selection module is further configured to read a configuration defining one or more templates associated with the one of the particular generation units. The interface module is further configured to pass back to the entity sending the input a reference to a generated output. The generation tasks are associated with a template or class. One of the different systems is associated with a Web Dynpro system, a data dictionary system, or a common model system. One of the development environments is associated with an Eclipse IDE, an ANT environment, or a console environment. One of the generation technologies is associated with Velocity, XSLT, or a Java class.

Implementations can realize one or more of the following advantages. The systems and techniques described herein can be used to implement a flexible generation framework that is easily extendable. The framework allows integration of different generator core types (e.g., a generator core for a UI application, a generator core for a data dictionary, and a generator core for a common model), so other types of generator cores can easily be added. The flexible generation framework allows integration of generator cores operating in different development environments (e.g., Eclipse Integrated Development Environment, Ant, Console), so additional generator cores can easily be added. The flexible generation framework allows generation tasks to be implemented using different generation technologies (e.g., Velocity, Extensible Style Sheet Transformations (XSLT), Java), so new generation technologies can easily be used. The generation framework can create different types of textual output (e.g., Java class, Extensible Markup Language (XML)). Because the framework provides a common interface to different generation technologies, the framework also facilitates high reuse, including reuse of generation tasks, generator cores, and generation technologies. One implementation of the invention provides all of the above advantages.

The details of one or more examples are set forth in the accompanying drawings and the description below. Further features, aspects, and advantages of the invention will become apparent from the description, the drawings, and the claims.

DETAILED DESCRIPTION

Figure 1A:
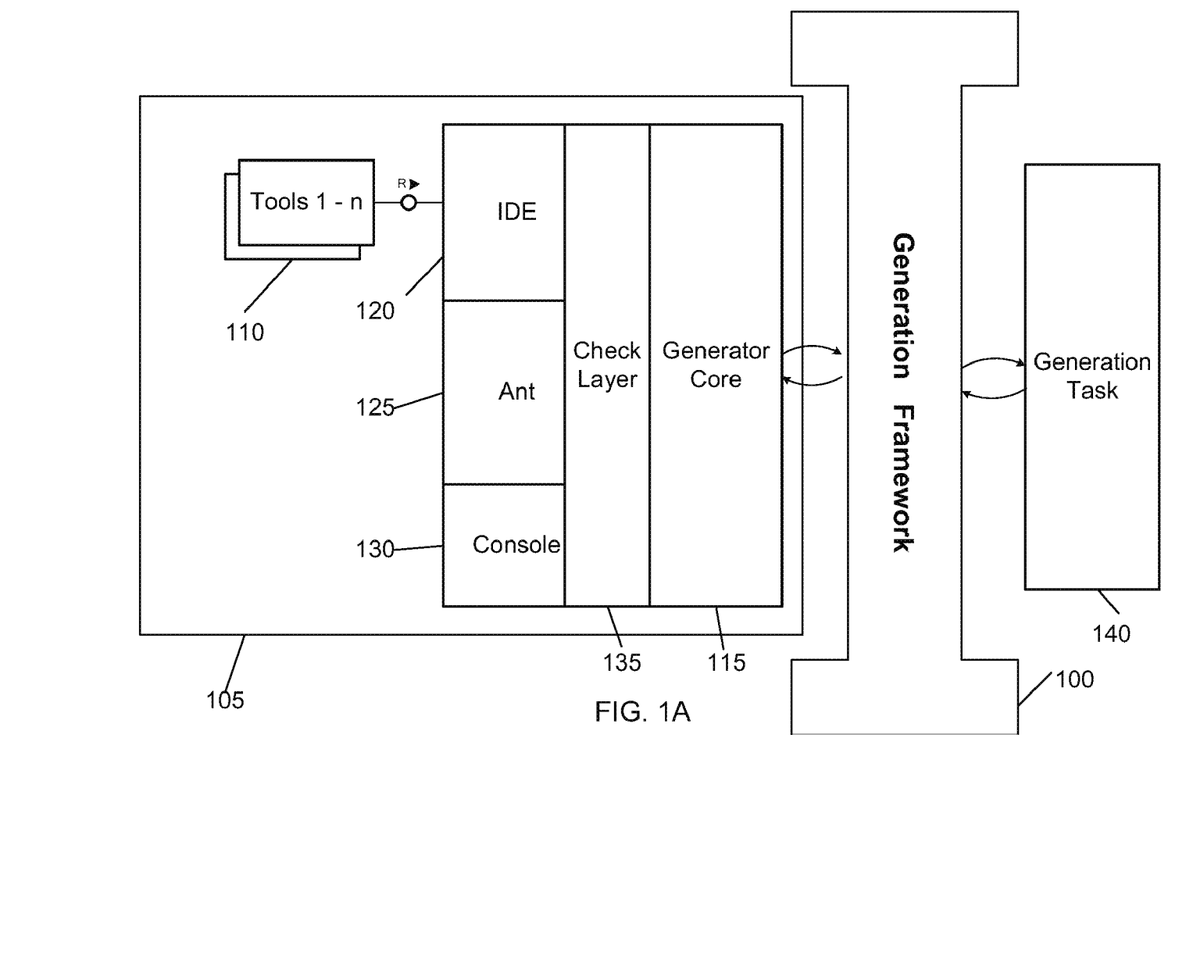
FIG. 1A is a block diagram of an example flexible generation framework.

FIG. 1A illustrates a flexible generation framework 100. The illustrated framework 100 provides a common interface used by a system 105 that uses a generator to produce code for a runtime environment. System 105 includes a tool set 110 and a generator core 115 associated with that specific system 105. The tool set 110 provides tools to enable a developer to create and modify data that describe the development items (e.g., applications, data dictionaries, common models, etc.) without the need for writing code for a specific runtime system. For example, the tools 110 can produce metadata that is used as input to the system specific generator core 115. The role of the generator core 115 is to marshal the input data (e.g., metadata, configuration, context parameters, etc.), and invoke the actual generation technologies using the generation framework 100, as described in more detail below.

As illustrated in FIG. 1A, the generator core 115 of the system 105 can be accessed using one of a variety of adapters corresponding to different development environments. An adapter serves as an interface between the environment and the generator core 115 and contains the logic to implement this interface. FIG. 1A illustrates three example adapters for three different environments: an Integrated Development Environment (IDE) adapter 120, an Apache Ant system adapter 125, and a console system adapter 130. The IDE can be, for example, an Eclipse Platform, which is an open source platform (described in more detail at www.eclipse.org). The Apache Ant system is an open source, Java-based build tool (described in more detail at ant.apache.org). The Console is a command line/batch type of environment. Different developers may want to use these different environments for different reasons, and the generation framework 100 can be used in conjunction with any of these environments.

In general, a generator uses data (e.g., declarative data from a declarative platform) as input, and produces file-based code as output. In some implementations, the input data is passed through a check layer 135, which verifies that the input data needed by the generator exists, and that the input data does not contain any errors. If an error is discovered, the generator halts the generation process. The calls to the check layer 135 and the handling of the returned results can vary depending on the different adapters 120, 125, and 130 used. For example, an IDE adapter 120 can insert data in a returned error string associated with a task in a task list. The Ant adapter 125 can either save an error string to a log file or display the error string to a user, depending on how the adapter 125 is configured. The Console adapter 130 can display the error string to a user using an information message.

The generator core 115 can produce a file-based output of several files bundled together in such a way as to make a deployable output that can be compiled by the target runtime system. For example, for a Java-based runtime system, the generator core 115 produces an output containing Java files, resource files, property files, and deployment descriptor files. The generator core 115 uses at least one generation task 140 to produce the output. The generation task 140 represents the specific generating instructions that are completed to generate the output. The generation task 140 encapsulates an associated generation technology (e.g., engine) used to execute the generation task 140. For example, as described in more detail below, a Velocity generation task uses Velocity templates to generate one or more files for the output. In some examples, as described in more detail below, the generation framework 100 uses a configuration file to select generator tasks.

Figure 1B:
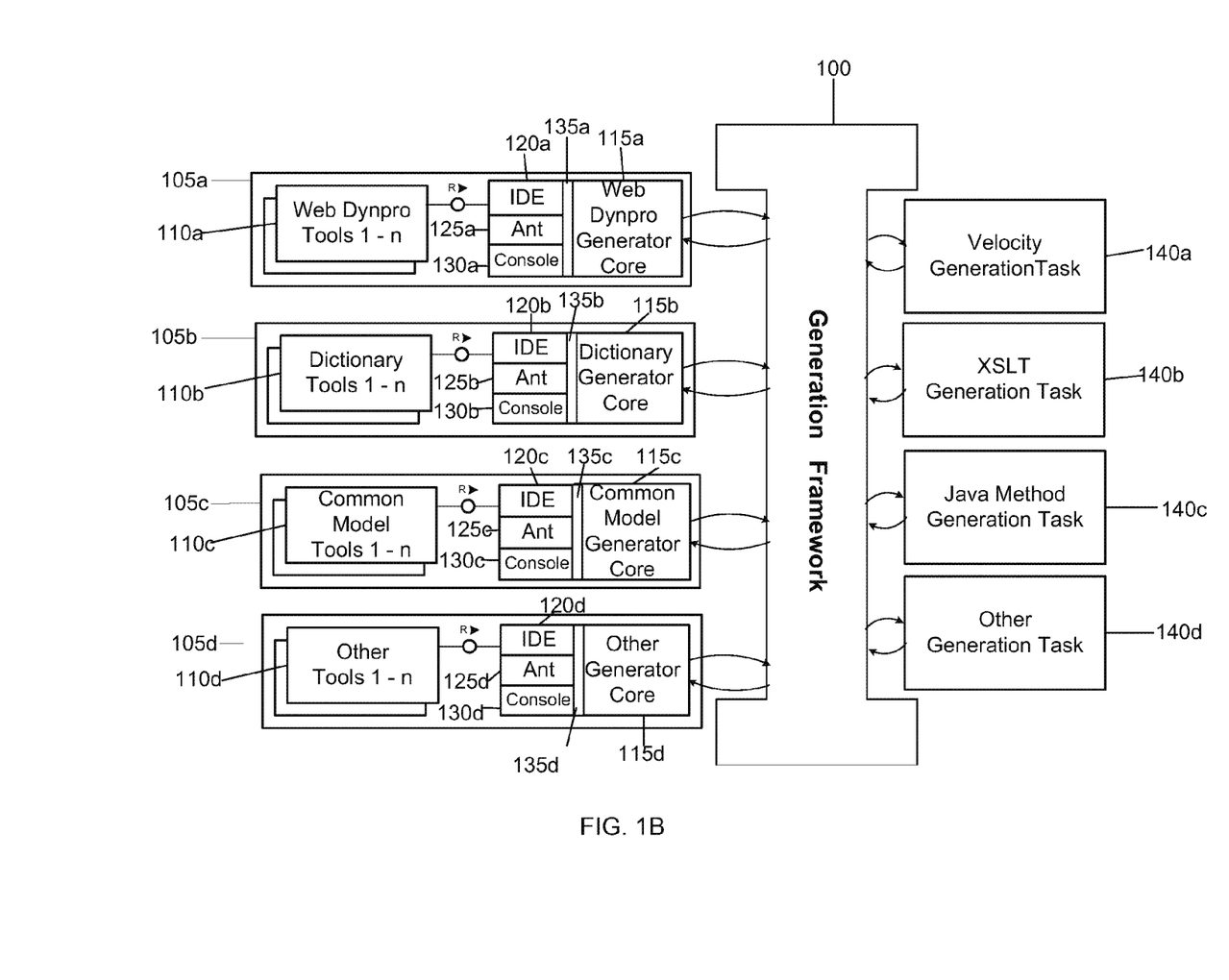
FIG. 1B is a block diagram of the example flexible generation framework with some example systems and generation technologies.

FIG. 1B illustrates the use of generation framework 100 by some examples of specific systems. The Web Dynpro system 105a is a system created by SAP AG of Walldorf (Baden), Germany (SAP), that provides a design time environment that enables a developer to model and design browser-based user interface applications independently of the underlying runtime environment on which the applications will run. The dictionary system 105b enables a developer to develop and customize data dictionaries used in applications. The common model system 105c enables a developer to develop and implement models and/or enhancements to models that are used by applications. The other system 105d is any other system that uses a generator to generate code for a runtime system. The other system 105d is included to emphasize the flexibility of the generation framework 100 and to illustrate how the generation framework 100 can accommodate any general system that uses the generation process.

In the illustrated example, the framework 100 produces code for specific runtime systems using the example generation tasks 140a, 140b, 140c, and 140d. Each generation task corresponds to a different generation technology. A generation task 140 encapsulates its generation technology (e.g., Velocity, Extensible Stylesheet Language Transformations (XSLT), Java, etc.) within a common interface, and serves as an extendable unit of the generation framework. That is, the generation framework 100 enables another generation technology to be added to the framework. The Velocity generation task 140a generates code using a template language in Velocity, which is a Java-based template engine that uses the template language to reference objects defined in Java code. The XSLT generation task 140b generates code using the Extensible Stylesheet Language Transformations (XSLT) to transform an Extensible Markup Language (XML) document having one structure into an XML document with a different structure. The Java Method generation task 140c generates code using the Java programming language. The other generation task 140d corresponds to any other generation technology that can be used to generate code for a runtime system. The other generation task 140d is included to emphasize the flexibility of the generation framework 100, and to illustrate how the generation framework 100 can accommodate any generation technology. Different developers may want to use these different generation technologies for different reasons, and generation framework 100 can be used to generate code using generation tasks corresponding to any such generation technologies.

Figure 2:
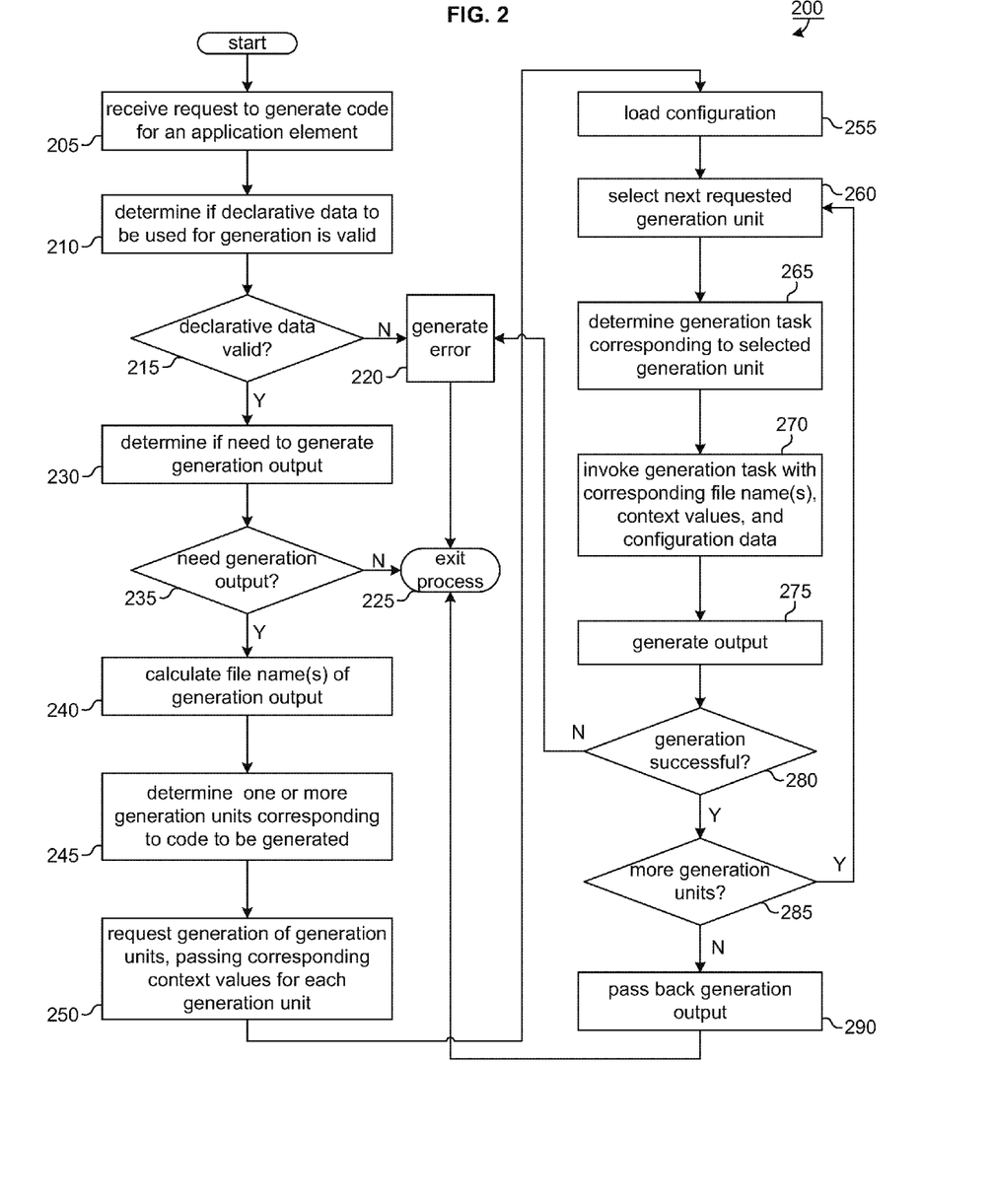
FIG. 2 is a block diagram of an example process for code generation.

FIG. 2 illustrates an example process 200 that uses the generation framework 100 of FIGS. 1A and 1B to generate code (e.g., in one or more output files). Process 200 includes receiving (205) a request to generate code for all or a portion of application elements defined by some declarative data. This can happen, for example, when the tools 110 transmit a request to generate code, received (205) by the generator core 115. For a specific example, in the Web Dynpro system 105a, two application elements are a component and a controller. In general, a Web Dynpro component is a reusable unit of a user interface application implemented using a Model-View-Controller architecture. A Web Dynpro controller is a unit within a component that is responsible for data binding between a model and a view. In this specific example, the Web Dynpro tools 110a transmit a request to the Web Dynpro generator core 115a to generate code for a developed controller, identified as controller1.

The declarative data is then checked to determine (210) whether the declarative data is valid. This can be done, for example, by passing the data to a check layer and using the check layer to verify the syntax and/or semantics of the data. For example, the generator core 115 can pass the data to check layer 135. In the specific Web Dynpro example, the Web Dynpro generator core 115a passes the declarative data corresponding to the controller1 to check layer 135 and the check layer 135 determines (210) whether the data is valid. If the data is not valid (215), an error message is generated (220) and the generation process is exited (225).

If the data is valid (215), then a check is performed to determine (230) if generation output has to be generated. For example, the generator core 115 can check (230) whether generation output has to be generated. The generator core 115 can use a dependency service, described in more detail below, for this for this check. Also, the generation framework 100 can check (230) whether generation output has to be generated. For example, the generation framework 100 determines whether generated output already exists for this data and whether the generated output is current (e.g., proper version). If the generated output is not needed (235), the generation process is exited (225).

If the generated output is needed (235), process 200 includes calculating (240) the name(s) to be given to the generated output file(s) and determining (245) the particular generation units that are applicable for the application elements for which generated output will be requested. For example, the generator core 115 can use a naming service, described in more detail below, to calculate (240) the names. In this example, the generator core 115 also determines (245) the particular generation units that are applicable for the application elements for which generation framework 100 is generating output. In general, a generation unit is a unit for which one output file is generated. For example, if a particular application element requires three output files to be generated to create that application element in a particular runtime environment, then there are three generation units (one to generate each file) associated with that particular application element. The generation units are predefined for the particular system (e.g., 105a, 105b, 105c, or 105d) that is providing the input to the generation framework 100. Referring back to the specific example of a Web Dynpro controller, as described in more detail below, the controller type determines the particular generation units that are applicable to a controller.

Process 200 includes requesting (250) generation of the determined generation unit(s) and passing (250) corresponding context values for each generation unit. For example, the generator core 115 passes (250) values of certain parameters (also referred to as context values) for the particular generation units that are applicable for the application elements for which generation framework 100 is generating output. To generate a particular output file associated with a particular generation unit, there may be certain parameter values that are needed by the generation task 140 that will be used to generate the output file, and so the generator core 115 passes (250) values for these parameters.

Process 200 includes loading (255) an applicable configuration, which is used to identify the generation tasks that generate the output code and provide any needed additional parameters, such as encoding. For example, as described in more detail below, the configuration can be defined using an XML file. In such an example, the generator core 115 provides to the generation framework 100 the file name and location of the configuration file so that generation framework 100 can load (255) the configuration. In general, a configuration can be defined for a particular system 105. Using the specific example of a Web Dynpro controller, a configuration can be defined that is applicable to and used for the generation of all Web Dynpro application elements. That is, the configuration contains configuration data for Web Dynpro controllers, as well as for other Web Dynpro application elements, such as a Web Dynpro component.

The next generation unit is selected (260). The first time through process 200, the next generation unit is the first generation unit on the list of the requested generation units. For the selected generation unit, a corresponding generation task is determined (265). For example, generation framework 100 reads the loaded configuration and determines (265), for each requested generation unit, the corresponding generation task 140. For example, to generate an output file for a particular generation unit, a Velocity template may be used. In this scenario, the configuration file can indicate the particular velocity template to be used (e.g., list its name). The suffix of the template name (e.g., .vm) indicates to the generation framework 100 that a Velocity template is the type of template used for generation of this particular generation unit.

Process 200 includes invoking (270) the determined generation task with the corresponding file name(s), context values, and configuration data and generating (275) the output. For example, generation framework 100 calls (270) the evaluated generation task 140 and passes (270) the context values, file names, and corresponding configuration data from the configuration file. Generation task 140 generates (275) the output using the corresponding generation technology (e.g., a Velocity engine for a Velocity template).

As can be seen from the process above, the generation framework 100 provides a common interface to the underlying generation technologies, because a generator core 115 does not need to have any knowledge about the generation technologies or about the appropriate calls to make for each generation technology. To generate code for an application element (or a portion thereof), a generator core can simply specify configuration data (e.g., in a configuration file), the name(s) of the file(s) to be generated, the particular generation units requiring generation, and the corresponding parameter values for each generation unit, regardless of the generation technology that will be used to complete the requested generation. Based on this input information, the generation framework 100 identifies one or more generation tasks and corresponding generation technologies to be used to generate code for the application element. Moreover, the generation framework knows the call structure that corresponds to each particular technology, and can thus invoke each generation technology with the relevant input information.

After the generation task has completed, process 200 includes determining (280) whether the generation was successful. For example, if a Velocity template is used, the generation framework 100 can check (280) whether the Velocity engine returned any errors when processing the template. If the generation was not successful, an error message is generated (220) and the generation process is exited (225).

If the generation was successful, process 200 includes determining (285) whether there are more generation units that need to be generated. If there are more generation units, then blocks 260-285 are repeated. If there are no more generation units, the generated output is passed (290) back to the requester. For example, the generation framework 100 passes (290) the result of the generation task 140 (e.g., delivers the absolute file name of a generation output) back to the generator core 115. The generator core 115 in turn passes (290) back the result to the applicable environment adapter (e.g., 120, 125, or 130). The environment adapter, depending on the environment, may perform some additional tasks with the generated output to make the generated output available for use in that environment. Referring back to the specific example of the Web Dynpro controller developed in an IDE environment, the Web Dynpro generator core 115a passes back the result to the IDE environment adapter 120a. The IDE environment adapter 120a publishes the generated file(s) in the Eclipse IDE resource framework so that the Web Dynpro tools 110a can work with the newly generated/updated output for controller1, since in the Eclipse IDE, tools can only work with the files published in the resource framework.

As described in process 200, the generation tasks can be broken down into units, referred to as generation units. The use of generation units provides flexibility because each output file (corresponding to a generation unit) can be generated using a different generation technology, if desired, since, as described above, the generation framework 100 identifies and calls the particular generation technology for each generation unit. To help illustrate this concept further, Table 1 and Table 2 provide specific examples of possible generation units for two application elements of a Web Dynpro application. Table 1 and Table 2 list the information that is passed between the generator core 115 and the generation framework 100, directly and/or through the use of a configuration (e.g., an XML file) for a particular generation unit, when the generator core 115 requests generation of that particular generation unit. Table 1 corresponds to a Web Dynpro component, which as described above is a reusable unit of a user interface application implemented using a Model-View-Controller architecture. Table 2 corresponds to a Web Dynpro controller, which as described above is a unit within a component that is responsible for data binding between a model and a view.

TABLE 1

Generation Units for an Application Component

| id | template/class | context |
|---|---|---|
| resource | Resource.vm | namingService<br>dependencyService<br>encoding<br>helper<br>component<br>language |
| defaultResource | DefaultResource.vm | namingService<br>dependencyService<br>encoding<br>helper<br>component |
| componentMessagePool | ComponentMessages.vm | namingService<br>dependencyService<br>encoding<br>helper<br>package<br>className<br>messagePool |

Table 1 includes three generation units that are associated with the generation of a user interface application at a Web Dynpro component level. Each generation unit has an associated identifier (ID), template or class, and context. The ID identifies the particular generation unit and is used to reference a particular generation unit. The template or class identifies a template or class that the generation framework 100 uses to generate code (e.g., an output file) for that particular generation unit. The templates can be thought of as rules for how the generation framework 100 generates the content of an output file. As described below, the configuration identifies to the generation framework 100 the template or class associated with a particular generation unit. The context lists the parameters for which the generation framework 100 can provide values to the template/class to perform the generation task for the particular generation unit. As described in process 200, the generator core 115 can pass (250) the context values to the generation framework 100 as the generation core 115 requests generation of certain generation units.

Various of the context parameters specified in Table 1 above will now be discussed. The naming service parameter is used to pass an object that provides, for example, a file name, a file extension, a package name, and other similar information for each generation unit. The naming service can also be used to get naming information for an instance of a first generation unit (e.g., generation unit a) during the generation of a second generation unit (e.g., generation unit b). The dependency service parameter is used to pass an object that provides information such as whether a certain model type has to be generated (e.g., for some models the design time data is sufficient), and how many files are involved. The encoding parameter defines the encoding specification with which the output files comply. As described below, this parameter can be defined using a configuration file. The helper parameter passes an object that provides help information. As described below, this parameter can be defined using a configuration file. The component parameter provides the design time data of a component instance used for generation of the runtime data/classes. The language parameter identifies the language for the generated component. For example, the ISO 639-1 standard can be used where two lower-case letters are used to represent a language (e.g., de for German and en for English). The defaultResource generation unit does not use a language parameter because the defaultResource generation unit uses the default language, which can be obtained directly from a component.

The componentMessagePool generation unit also has the parameters package and className, which directly identify a package name and a class name. These names can be obtained using a naming service. However, the componentMessagePool generation unit generates a Java output file, and the package name and the class name are generally always needed for a Java output file. Providing these needed names directly is more efficient than making the template (e.g., resource.vm) use the naming service to find the same information.

In the Table 1 examples, the value in the template/class column for each generation unit has a .vm suffix, which indicates that the templates use the Velocity generation technology. For an illustrative example, the templates for the resource and defaultResource generation units follow. To assist with the description, letters in parentheses have been added to the template code for simple reference and are not to be considered part of the template code itself.

```
#** -------------------------------------------------------------------------------
* Copyright (c) 2002 SAP AG. All Rights Reserved.
*
* Template used to generate a language dependent Resource Property File for a Component.
*
(a) * #param helper              TemplateHelper      Instance of helper class
(b) * #param component           Component           Component to extract resources from
(c) * #param language            String              Language to extract resources for
(d) * #param namingService       NamingService
(e) * #param dependencyServiceDependencyService
(f) * #param encoding            String              Defines encoding of generated output
*
* -------------------------------------------------------------------------------- *###

(g) #parse("_Resource.vm")
```

The above template is an example of a resource.vm template for a resource generation unit. Lines (a)-(f) list the parameters that this particular template uses. In this example, the list corresponds to the context parameter list in Table 1 for the resource generation unit. In line (g), the resource.vm template parses the_Resource.vm template. Due to its size, an example of the_Resource.vm template is included at the end of the description.

Table 1 for the defaultResource generation unit. In line (f), the default language is obtained. As described above, the generation core 115 does not pass a language parameter for the defaultResource generation unit because only the default language is used. The default language is obtained from the Web Dynpro component itself using line (f). Similar to the resource.vm template, in line

```
#** -------------------------------------------------------------------------------
* Copyright (c) 2002 SAP AG. All Rights Reserved.
*
* Template used to generate Resource Property File for a Component containing all
resources for the default language of the component.
*
(a) * #param helper              TemplateHelper      Instance of helper class
(b) * #param component           Component           Component to extract resources from
(c) * #param namingService       NamingService
(d) * #param dependencyService DependencyService
(e) * #param encoding            String              Defines encoding of generated output
*
* -------------------------------------------------------------------------------- *###

(f) #set($language = $component.textPool.rawLanguage)
(g) #parse("_Resource.vm")
```

The above template is an example of a defaultResource.vm template for a defaultResource generation unit. Lines (a)-(e) list the parameters that this particular template uses. In this example, the list corresponds to the context list in (g), the defaultResource.vm template parses the_Resource.vm template. Due to its size, the example of the_Resource.vm template is included at the end of the description.

TABLE 2

| Generation Units for an Application Controller | | |
|---|---|---|
| id | template/class | context |
| generatedController | InternalController.vm | namingService<br>dependencyService<br>encoding<br>helper<br>package<br>className<br>controller |
| publicControllerInterface | IPublicController.vm | namingService<br>dependencyService<br>encoding<br>helper<br>package<br>className<br>controller |

TABLE 2-continued

Generation Units for an Application Controller

| id | template/class | context |
|---|---|---|
| externalControllerInterface | IExternalController.vm | namingService<br>dependencyService<br>encoding<br>helper<br>package<br>className<br>controller |
| privateControllerInterface | IPrivateController.vm | namingService<br>dependencyService<br>encoding<br>helper<br>package<br>className<br>controller |
| editableController | Controller.vm | namingService<br>dependencyService<br>encoding<br>helper<br>package<br>className<br>controller |
| publicPartPublishController | Com.sap.ide.webdynpro.<br>generation.runtime.<br>ControllerPublisher<br>(methodName = generate) | namingService<br>dependencyService<br>encoding<br>controller |

Table 2 illustrates additional examples of generation units. As described above, the examples in Table 2 correspond to a Web Dynpro controller. As illustrated in Table 2, there are six possible generation units for a Web Dynpro controller. The type of controller determines which generation units the generation framework 100 uses. For example, for a view controller, the generation framework 100 uses three generation units, the publicControllerInterface generation unit, the privateControllerInterface generation unit, and the editableController generation unit. For a component controller, the generation framework 100 uses four generation units, the publicControllerInterface generation unit, the externalControllerInterface generation unit, the privateControllerInterface generation unit, and the editableController generation unit. Similar to the generation units in Table 1, each generation unit has an associated ID, template or class, and context listing. In Table 2, the template/class used to generate code for the last generation unit, publicPartPublishController, does not have a .vm suffix because the generation unit does not use a Velocity template. Instead, a class (ControllerPublisher) is listed that is used to define a method. The name of the method is arbitrary and in this example, the name of the method is "generate". A configuration file is used to further define the generate method, and is described in more detail below.

In addition to a template and a context, each generation unit has predefined output parameters. Table 3 and Table 4 illustrate the output parameters corresponding to the generation units of Table 1 and Table 2, respectively.

TABLE 3

Output Information for Component Generation Units

| id | encoding | content type | naming |
|---|---|---|---|
| resource | ISO8859_1 | text | packages/${Component.package}.wdp.Resource${Component.name}_${language}.properties |
| defaultResource | ISO8859_1 | text | packages/${Component.package}.wdp.Resource${Component.name}.properties |
| componentMessagePool | UTF-8 | Java | packages/${MessagePool.package}.wdp.Imessage${Component.[N]ame} |

In these examples, the generation framework 100 produces one file for each generation unit. Table 3 lists information corresponding to the generated output file for the three generation units for a Web Dynpro component. Each generation unit has a particular encoding specification with which the output file complies, a content type for the generated output file, and a naming schema for the output file. As described below, a value for the output encoding parameter can be defined using a configuration file. The content type is a result of the generation process. In the example in Table 3, the first two generation units produce text files (i.e., the content of the files corresponding to the generated resource and default resource files is a text file). The third generation unit produces a Java file (i.e., the content of the file corresponding to the generated message pool of a Web Dynpro component is a Java file). The content type is included in Table 3 and Table 4 to illustrate how different content types affect the generation process. For example, the content type can affect the parameters passed in the context listing (e.g., package and className are included context parameters for Java content type files). The naming schema defines the name given to the output file and includes variables so that specifics can be used that correspond to the specific component for which code is being generated. The naming schema includes the symbol "[N]ame". The capital "N" in brackets specifies that if the name of the corresponding application element (e.g., a component for the schema component.[N]ame) starts with a small letter, the first letter is transformed to a capital letter. For example, for a component application element named "mycomponent", the naming schema component [N]ame transforms the name to "Mycomponent". This is necessary in some examples to fulfil naming conventions of the a particular language, such as Java.

TABLE 4

Output Information for Controller Generation Units

| id | encoding | content type | naming |
|---|---|---|---|
| generatedController | UTF-8 | Java | packages/${Controller.package}.wdp.${Controller.[N]ame} |
| publicControllerInterface | UTF-8 | Java | packages/${Controller.package}.wdp.IPublic${Controller.[N]ame} |
| externalControllerInterface | UTF-8 | Java | packages/${Controller.package}.wdp.IExternal${Controller.[N]ame} |
| privateControllerInterface | UTF-8 | Java | packages/${Controller.package}.wdp.IPrivate${Controller.[N]ame} |
| editableController | UTF-8 | Java | packages/${Controller.package}.${Controller.[N]ame} |
| publicPartPublishController | UTF-8 | XML | packages/${Controller.package}.${Controller.name}.wdcontroller |

Table 4 illustrates output information for the six example generation units for a Web Dynpro controller. Similar to the examples in Table 3, each generation unit in Table 4 has a particular encoding, a content type, and a naming schema for the output file. The naming schema defines the name given to the output file and includes variables so that specifics can be used that correspond to the specific controller for which code is being generated.

As described above, the templates and classes listed in the template/class column of Table 1 and Table 2 are used to generate code for a particular generation unit.

These values can be passed to the generation framework 100 using a configuration implemented using an XML configuration file. As described in process 200 above, the generation framework 100 reads the configuration file to determine (265), among other things, the applicable generation technology to generate code for a particular generation unit. The code that immediately follows is an example document type definition (DTD) corresponding to the example XML configuration file described further below.

```
<!ELEMENT generationConfiguration (templateConfiguration?,
methodConfiguration?)>
<!ATTLIST generationConfiguration
        id CDATA #REQUIRED
>
<!ELEMENT templateConfiguration (templates+)>
<!ELEMENT templates (template+)>
<!ELEMENT template (#PCDATA)>
<!ATTLIST template
        id CDATA #REQUIRED
        templateHelperClass CDATA #IMPLIED
        source (resource | file) "resource"
        templateEncoding CDATA "UTF-8"
        outputEncoding CDATA "UTF-8"
>
```

-continued

```
<!ELEMENT methodConfiguration (methods+)>
<!ELEMENT methods (method+)>
<!ELEMENT method (#PCDATA)>
<!ATTLIST method
        id CDATA #REQUIRED
        generationClass CDATA #REQUIRED
        static (true | false) "false"
        outputEncoding CDATA "UTF-8"
>
```

The following XML file represents a portion of an example configuration file used by the generation framework 100, and references some of the identified templates, classes, and parameters listed in Tables 1-4. To assist with the description below, letters in parentheses have been added to the XML configuration file for simple reference and are not to be considered part of the XML code itself.

```
(a) <?xml version="1.0" encoding="UTF-8"?>
(b) <!DOCTYPE generationConfiguration SYSTEM ".\GenerationConfiguration.dtd">
(c) <generationConfiguration id="Web Dynpro Generation">
(d)   <templateConfiguration>
(e)     <templates>
(f)       <!-- resource -->
(g)       <template id="resource"
templateHelperClass="com.sap.ide.webdynpro.generation.runtime.TemplateHelper"
source="resource" templateEncoding="UTF-8"
outputEncoding="ISO8859_1">Resource.vm</template>
(h)       <template id="defaultResource"
templateHelperClass="com.sap.ide.webdynpro.generation.runtime.TemplateHelper"
```

```
source="resource" templateEncoding="UTF-8"
outputEncoding="ISO8859_1">DefaultResource.vm</template>
(i)      <!-- component message pool -->
(j)      <template id="componentMessagePool"
templateHelperClass="com.sap.ide.webdynpro.generation.runtime.TemplateHelper"
source="resource" templateEncoding="UTF-8" outputEncoding="UTF-
8">ComponentMessages.vm</template>
(k)      <!-- controller -->
(l)      <template id="externalControllerInterface"
templateHelperClass="com.sap.ide.webdynpro.generation.runtime.TemplateHelper"
source="resource" templateEncoding="UTF-8" outputEncoding="UTF-
8">IExternalController.vm</template>
(m)      <template id="publicControllerInterface"
templateHelperClass="com.sap.ide.webdynpro.generation.runtime.TemplateHelper"
source="resource" templateEncoding="UTF-8" outputEncoding="UTF-
8">IPublicController.vm</template>
(n)      <template id="privateControllerInterface"
templateHelperClass="com.sap.ide.webdynpro.generation.runtime.TemplateHelper"
source="resource" templateEncoding="UTF-8" outputEncoding="UTF-
8">IPrivateController.vm</template>
(o)      <template id="editableController"
templateHelperClass="com.sap.ide.webdynpro.generation.runtime.TemplateHelper"
source="resource" templateEncoding="UTF-8" outputEncoding="UTF-
8">Controller.vm</template>
(p)      <template id="generatedController"
templateHelperClass="com.sap.ide.webdynpro.generation.runtime.TemplateHelper"
source="resource" templateEncoding="UTF-8" outputEncoding="UTF-
8">InternalController.vm</template>
(q)      </templates>
(r)      </templateConfiguration>
(s)      <methodConfiguration>
(t)      <methods>
(u)      <!-- controller -->
(v) <method id="publicPartPublishController"
generationClass="com.sap.ide.webdynpro.generation.runtime.ControllerPublisher"
static="true" outputEncoding="UTF-8">generate</method>
(w)      </methods>
(x)      </methodConfiguration>
(y)</generationConfiguration>
```

In the sample portion of the configuration file above, line (a) defines the version and encoding of the XML file itself. Line (b) defines the document type definition (DTD) for this configuration file, an example of which is included above. Line (c) starts the generation configuration tag and identifies the generation configuration as "Web Dynpro Generation" using the ID parameter. The closing tag for the generation configuration is located at line (y). Everything between lines (c) and (y) defines this generation configuration. Continuing with the examples in Tables 1-4, this portion of the generation configuration deals with a Web Dynpro user interface application, and even more specifically, with the component and controller elements of a Web Dynpro user interface. This portion of the configuration file further configures generation templates and a generation method. The template configurations are defined between the template configuration tags located at lines (d) and (r). In this example, the configuration file defines the helper class (i.e., the helper parameter in the context listing) for each of the templates. The method configuration is defined between the method configuration tags located at lines (s) and (x).

Taking the configurations in the order that they appear in the configuration file, line (f) includes a comment tag indicating that the next two configurations deal with resource generation units (i.e., the resource and defaultResource generation units specified in Table 1 and Table 3). Line (g) defines the configuration for the resource generation unit specified in Table 1 and Table 3. Between the open template tag and the close template tag, the template Resource.vm is listed. As listed in Table 1, this is the corresponding template for the resource generation unit. When generation framework 100 reads this portion of the file, generation framework 100 identifies that the Resource.vm is a template used for generation The open tag includes several parameters to define the helper class for the Resource.vm template. The first parameter is the id parameter. The value of this id parameter indicates the generation unit to which the template between the template tags (i.e., Resource.vm) corresponds. The value is resource, which is the id listed in Table 1 that corresponds to the Resource.vm template. The next parameter is the templateHelperClass. The value of this parameter indicates that the identified class corresponds to the helper parameter listed in the context column in Table 1. The other parameters listed in the context column of Tables 1-2 that correspond to classes (e.g., namingService, dependencyService) can also be defined in this configuration file using a similar format to the examples shown. The object that includes the helper class for this generation unit is identified in the value for the templateHelperClass parameter of line (g) (i.e., com.sap.ide.webdynpro.generation.runtime.TemplateHelper).

The next parameter is the source parameter, whose value of resource indicates that the source file for the template is loaded via a class loader. According to the example DTD above, the other value for the source parameter is file. If the value is file, a reference pointing to the template source file would be provided. The use of a file value and providing a file pointer is advantageous where a developer wants to perform incremental generations. By using a file and pointer, the developer simply has to change the file and save the file again, since there is no use of a class loader. The next parameter is the templateEncoding parameter, whose value of UTF-8 indicates the specification with which the template Resource.vm complies. The next parameter is the outputEncoding parameter, whose value of ISO8859_1 indicates the specification with which the generated output complies. This value corresponds to the value listed in the encoding column of Table 3. Line (h) follows the same format as described above for line (g). The id parameter in the open template tag is defaultResource, indicating that this configuration corresponds to the generation unit defaultResource. The template identified between the open template and close template tags is Default-Resource.vm, which is the template associated with the generation unit defaultResource.

Line (i) includes a comment tag indicating that the next portion of the configuration deals with the componentMessagePool generation unit specified in Table 1 and Table 3. Line (j) follows the same format as described above for line (g). The id parameter in the open template tag is componentMessagePool, indicating that this configuration corresponds to the generation unit componentMessagePool. The template identified between the open template and close template tags is ComponentMessages.vm, which is the template associated with the generation unit componentMessagePool.

Line (k) includes a comment tag indicating that the next configurations deal with the controller generation units of Table 2 and Table 4. Lines (l)-(p) follow the same format as described above for line (g) and they correspond to the first five generation units, not necessarily in order, of Tables 2 and 4. For example, in line (l), the id parameter in the open template tag is externalControllerInterface, indicating that this configuration corresponds to the generation unit externalControllerInterface. The template identified between the open template and close template tags is lExternalController.vm, the template associated with the generation unit externalControllerInterface.

As described above, the generation unit publicPartPublishController (in the last row of Table 2 and Table 4) does not identify a template, but instead identifies a class ControllerPublisher. This provides an example where the generation technology is not a Velocity template, but instead a Java method and class. This example illustrates how each generation unit can use its own generation technology to generate its corresponding output. The lines between (s) and (x) define a configuration for a method, identifying the Java class to use for the generation method. Line (u) includes a comment tag indicating that the next method configuration deals with the controller generation units (e.g., the generation units listed in Table 2 and Table 4). Line (v) defines the configuration for the publicPartPublishController generation unit of Table 2 and Table 4. Between the open method tag and the close method tag, the method named "generate" is listed.

The open method tag includes several parameters to define the configuration for the generate method. The first parameter is the id parameter. The value of this id parameter indicates the generation unit to which the method between the method tags (i.e., generate) corresponds. The value is publicPartPublishController. The next parameter is the generationClass. The value of this parameter indicates the generation class for this generation unit (i.e., com.sap.ide.webdynpro.generation.runtime.ControllerPublisher). This class (i.e., ControllerPublisher) corresponds to the class listed in Table 2 for the generation unit publicPartPublishController.

The next parameter is the static parameter, whose value of true indicates that this method is a static method, which means that the generation framework 100 does not need to instantiate an object prior to calling this method. The next parameter is the outputEncoding parameter, whose value of UTF-8 indicates the specification with which the generated output complies. This value corresponds to the value listed in the encoding column of Table 4 for the generation unit publicPartPublishController.

Figure 3:
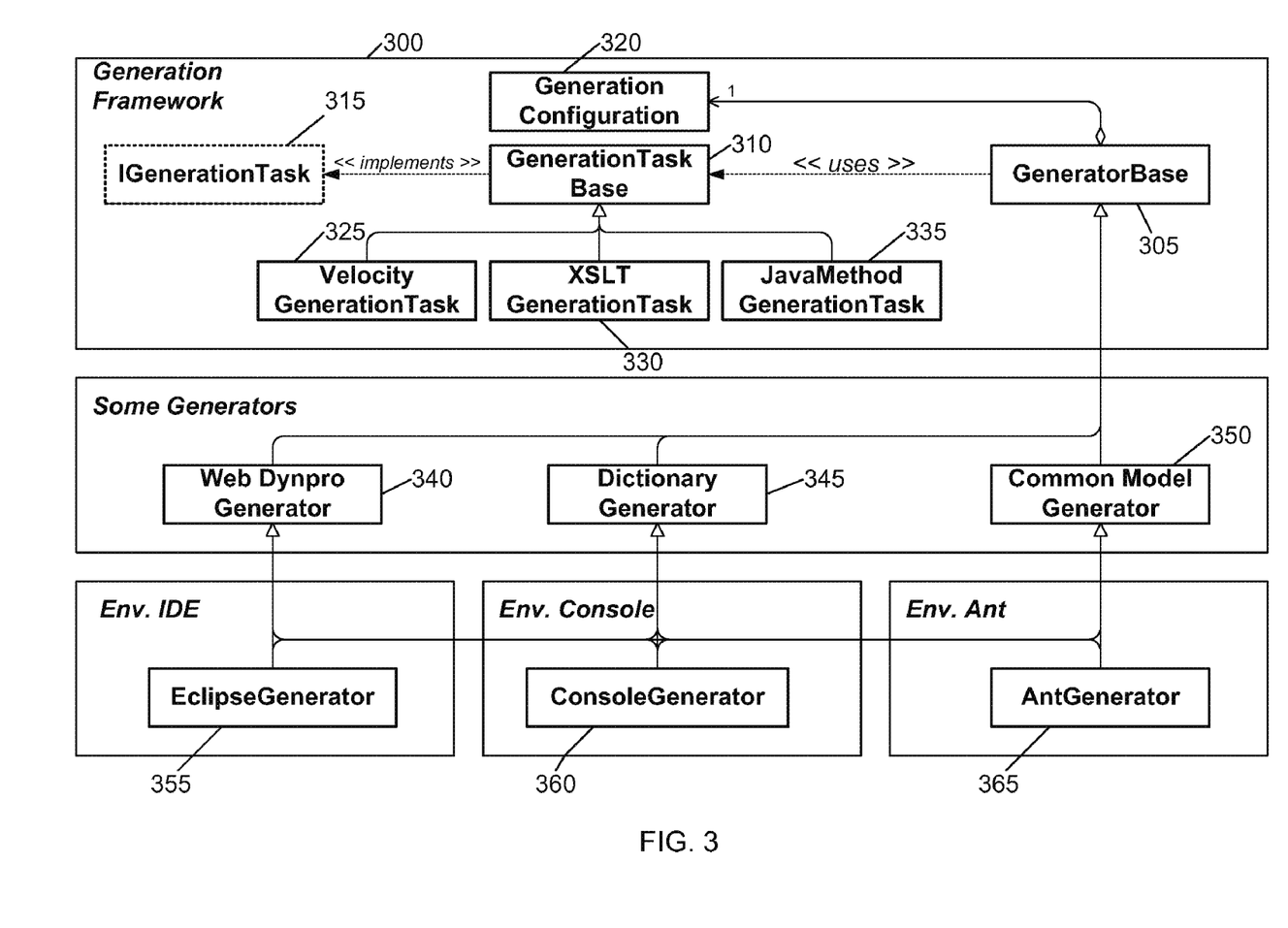
FIG. 3 is a Universal Markup Language (UML) class diagram of a flexible generation framework.

FIG. 3 illustrates a UML class diagram of a generation framework 300. The generation framework 300 includes a generator base class 305. The generator base class 305 uses a generation task base class 310, which implements a generation task interface class 315 to perform the generation of software code. The generator base class 305 has an aggregation relationship to a generation configuration class 320. The cardinality of this relationship is not more than one instance of the generation configuration class 320 for an instance of the generator base class 305. An example portion of an instance of the generation configuration class 320 is the XML configuration file described above.

Both the generator base class 305 and the generation task base class 310 are superclasses of multiple, different subclasses. This illustrates how the generation framework 300 can be adapted to handle multiple generator cores and multiple generation technologies. Starting first with the generation task base class 310, there are three specialized subclasses illustrated in FIG. 3, namely a Velocity generation task class 325, a XSLT generation task class 330, and a Java method generation task class 335. As described above, these specialized classes 325, 330, and 335 perform the requested tasks to generate software code using their particular corresponding generation technology.

The other superclass is the generator base class 305. There are three specialized subclasses illustrated, namely a Web Dynpro generator class 340, a dictionary generator class 345, and a common model generator class 350. As described above, these classes transmit a request to the generation framework to generate code for their particular system. As also described above, a flexible generation framework can interface with different types of generator cores (e.g., of different systems) operating in different development environments. In the illustrated implementation of FIG. 3, each specialized generator core class 340, 345, and 350 is a superclass for the specialized.development environment classes 355, 360, and 365. Development environment class 355 represents an adapter to an Eclipse IDE environment. Development environment class 360 represents an adapter to a Console environment. Development environment class 365 represents an adapter to an Ant environment.

For the different development environments, the calls a user makes to a generator core to initiate generation of an application element are different. For example, in a Console development environment, an example call is as follows:

```
@echo off
setlocal
rem *** parameter ***
@SET CFG=C:\Users\D020094 Joachim Bender\Public\Install\ConsoleGenerator\cfg\WebDynproGenerationConfiguration.xml
@SET SOURCE_PATH=C:\dtr\ls4011\BuildServer\functiontest\buildplugin\pluginTestSC\inactive\
```

```
DCs\sap.com\WD2a\_comp\src\packages
@SET TARGET_PATH=C:\temp\WD1test
@SET PACKAGE=com.sap.components
@SET COMPONENT=Component2
@SET java_home=C:\jdk\jdk1.3.1_04
@SET LANGUAGE=en
rem @SET
ADD_PATHS=C:\Perforce\tc\DictionaryMetamodel\dev\src\_metamodel_dictionary\content;
C:\Perforce\tc\WebDynproMetamodel\dev\src\_metamodel_webdynpro_eclipse\content
@SET ADD_PATHS="C:\Users\D020094 Joachim
Bender\Public\Install\ConsoleGenerator\lib\dictionary\metamodel\SapMetamodelDictionaryContent.zip;
C:\Users\D020094 Joachim
Bender\Public\Install\ConsoleGenerator\lib\webdynpro\metamodel\SapMetamodelWebdynproContent.zip"
rem *** java call ***
%java_home%\bin\java -cp..\
lib\common\SapGenerationFrameworkCore.jar;..\lib\common\metamodel\s2xapi.jar;..\lib\common\
metamodel\SapMetamodelCore.jar;..\lib\common\tssap\util\plugin.jar;..\lib\common\
velocity\velocity-dep-
1.3.jar;..\lib\common\xmlparser\SAPXMLToolkit.jar;..\lib\webdynpro\SapIdeWebDynproGeneration.jar;..\
lib\webdynpro\SapIdeWebdynproChecklayer.jar;..\lib\webdynpro\metamodel\
SapMetamodelWebdynpro.jar;..\lib\webdynpro\runtime\_webdynpro_basesrvc.jar;..\lib\webdyn
pro\runtime\_webdynpro_generation_addon.jar;..\lib\webdynpro\runtime\_webdynpro_run
time_repository.jar;..\lib\common\logging\logging.jar;..\lib\common\logging\loggingStandard.jar;..\lib\
dictionary\metamodel\SapMetamodelDictionary.jar
com.sap.ide.webdynpro.generation.console.GenerationConsole -cfgfile "%CFG%" -
sourcepath "%SOURCE_PATH%" -d "%TARGET_PATH%" -package %PACKAGE% -
component %COMPONENT% -language %LANGUAGE% -addpaths %ADD_PATHS%
rem -deployment
endlocal
```

In an Ant environment, an example call is as follows:

```
<wdgen sourcepath="C:\Documents and
Settings\d020094\.dtc\LocalDevelopment\DCs\sap.com\wd_test\comp\src/packages"
targetpath="C:\Documents and
Settings\d020094\.dtc\LocalDevelopment\DCs\sap.com\wd_test\comp\gen\default\t/gwd"
addpaths="C:\IDE\630_SP_COR\installation\eclipse\plugins\com.sap.tc.ap\comp\SAP_BUI
LDT\DCs\sap.com\tc\bi\mm\_comp\gen\default\public\def\lib\model\SapMetamodelDictionaryContent.zip"
language="en"
deployment="true"
vendor="sap.com"
dcname="wd_test"
archivename="sap.com~wd_test"/>
```

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed and apparatus can be implemented by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special purpose logic circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. The alternative examples are for illustration only and not to limit the alternatives in any way. The steps of the invention can be performed in a different order and still achieve desirable results. The boundaries of the generation framework as illustrated in the figures are exemplary only and do not indicate limits for logical or physical boundaries of the framework. For example, the specific generator cores 115 (or portions thereof) and the generation tasks 140 (or portions thereof) can be included in or excluded from the boundaries of the generation framework 100. The same is applicable for the specialized classes 325-365 (or portions thereof), which can be included in or excluded from the boundaries of the generation framework 300. In addition, although the examples above showed the generation of Java and XML files, other types of code files can also generated, such as Cobol, C++, C#, and the like. As an alternative to the configuration file, the generation framework 100/300 can include an API that a generator core 115 uses to pass all of the parameters and other information contained in the configuration file.

The following code, listed at the end of the description due to its size, is an example of the _Resource.vm template used by both the resource.vm template and the defaultResource template. As can be seen by the contents, the template defines the code that generates the resources for the given text pool.

```
* ---------------------------------------------------------------------------------------
* Copyright (c) 2002 SAP AG. All Rights Reserved.
*
* Template Include used to generate a property file with the language dependent texts of a
Component for a given language.
*
* The velocity context must include at least the following entries:
*
* #param package       String              Qualified name of the package that the generated
*                                          class resides in.
* #param className     String              Unqualified class name of the generated
*                                          compilation unit
* #param helper        TemplateHelper      helper class provides some helper methods
* #param component     Component           The component to extract the resources from
* #param language      String              The language to extract the resources for
* #param   encoding         String                   Defines encoding of generated output
*
* --------------------------------------------------------------------------------------- *###

#** ---------------------------------------------------------------------------------------
* generates the resources for the given text pool.
* --------------------------------------------------------------------------------------- *###
#macro(dumpTextPool $helper $mdo $baseName $language $comment)
#set($c = "#")
#if(!$mdo.textPool.isEmpty( ))
$comment
#foreach($translatableText in $indo.textPool.texts)
#set($text = $translatableText.getText($language))
#if($text != "")
$c $baseName, $translatableText.key
$helper.convertTextKey($baseName, $translatableText.key) = $helper.escapePropertyValue($text)
#end
#end
#end
#end

#set($c = "#")
$c ---------------------------------------------------------------------------------
$c This file has been generated by the Web Dynpro Code Generator
```

-continued

```
$c DON'T MODIFY!!! CHANGES WILL BE LOST WHENEVER THE FILE GETS
GENERATED AGAIN
$c ----------------------------------------------------------------------------
$c Resource bundle for ${component.name}
#if($component.hasMessagePool( ))
#dumpTextPool($helper $component.messagePool "" $language "$c message pool")
#end
#foreach($controller in $component.controllers)
#dumpTextPool($helper $controller $controller.name $language "$c controller
$controller.name")
#end
#foreach($view in $component.views)
#dumpTextPool($helper $view $view.name $language "$c view $view.name")
#end
#foreach($window in $component.windows)
#dumpTextPool($helper $window $window.name $language "$c window $window.name")
#end
```

What is claimed is:

1. A machine-readable storage device embodying a computer program product for performing a method, said method comprising:

generating, in a first declarative development environment, a first request to generate code for first application elements in the first declarative development environment, and generating, in a second declarative development environment, a second request to generate code for second application elements in the second declarative development environment, wherein the first application elements are defined by first declarative data in the first declarative development environment, and wherein the second application elements are defined by second declarative data in the second declarative development environment;

receiving the first declarative data in a first code generator core, and receiving the second declarative data in a second code generator core, wherein the first code generator core is configured to produce a first type of generated code corresponding to the first declarative development environment, wherein the second code generator core is configured to produce a second type of generated code corresponding to the second declarative development environment, and wherein the first code generator core has corresponding first configuration data and the second code generator core has corresponding second configuration data;

receiving, in a code generator framework, first parameter values corresponding to the first declarative data and second parameter values corresponding to the second declarative data;

loading, in the code generation framework, the first and second configuration data, wherein the code generation framework selects, based on the first configuration data, a first code generation task, and further selects, based on the second configuration data, a second code generation task, wherein the first code generation task encapsulates an associated first code generation technology and the first code generation technology is used to execute the first generation task, and wherein the second code generation task encapsulates an associated second code generation technology and the second code generation technology is used to execute the second generation task; and generating first code for the first application elements based on the first parameter values and the first configuration data using the first code generation technology, and generating second code for the second application elements based on the second parameter values and the second configuration data using the second code generation technology.

2. The computer program product of claim 1 wherein the code generation framework provides a common interface between a plurality of different code generator cores and a plurality of different code generation technologies.

3. The computer program product of claim 1 further comprising, before generating said first or second code, determining first generation units applicable to the first application elements and determining second generation units applicable to the second application elements, wherein each generation unit corresponds to a single generated code file.

4. The computer program product of claim 3 wherein the first parameter values include context values for a first generation unit and the second parameter values include context values for a second generation unit.

5. The computer program product of claim 3 wherein said code generation framework determines, based on the first and second loaded configuration data, corresponding code generation tasks for the first and second generation units.

6. The computer program product of claim 1 further comprising a first adapter configured between the first declarative development environment and the first code generator core and a second adapter configured between the second declarative development environment and the second code generator core, wherein the first adapter serves as an interface between the first declarative development environment and the first code generator core and the second adapter serves as an interface between the second declarative development environment and the second code generator core.

7. The computer program product of claim 1 wherein the code generator framework produces the first code to the first code generator core from the first code generation technology as a plurality of files for compilation by a first target runtime system, and wherein the code generator framework produces the second code to the second code generator core from the second code generation technology as a plurality of files for compilation by a second target runtime system.

8. A computer system comprising:
one or more processors; and
memory, the memory storing a computer program, wherein the computer program:
generates, in a first declarative development environment, a first request to generate code for first application elements in the first declarative development environment, and generates, in a second declarative development environment, a second request to generate code for second application elements in the second declarative development environment, wherein the first application elements are defined by first declarative data in the first declarative development environment, and wherein the second application elements are defined by second declarative data in the second declarative development environment;

receives the first declarative data in a first code generator core, and receives the second declarative data in a second code generator core, wherein the first code generator core is configured to produce a first type of generated code corresponding to the first declarative development environment, wherein the second code generator core is configured to produce a second type of generated code corresponding to the second declarative development environment, and wherein the first code generator core has corresponding first configuration data and the second code generator core has corresponding second configuration data;

receives, in a code generator framework, first parameter values corresponding to the first declarative data and second parameter values corresponding to the second declarative data;

loads, in the code generation framework, the first and second configuration data, wherein the code generation framework selects, based on the first configuration data, a first code generation task, and further selects, based on the second configuration data, a second code generation task, wherein the first code generation task encapsulates an associated first code generation technology and the first code generation technology is used to execute the first generation task, and wherein the second code generation task encapsulates an associated second code generation technology and the second code generation technology is used to execute the second generation task; and generates first code for the first application elements based on the first parameter values and the first configuration data using the first code generation technology, and generating second code for the second application elements based on the second parameter values and the second configuration data using the second code generation technology.

9. The system of claim 8 wherein the code generation framework provides a common interface between a plurality of different code generator cores and a plurality of different code generation technologies.

10. The system of claim 8 further comprising, before generating said first or second code, determining first generation units applicable to the first application elements and determining second generation units applicable to the second application elements, wherein each generation unit corresponds to a single generated code file.

11. The system of claim 10 wherein the first parameter values include context values for a first generation unit and the second parameter values include context values for a second generation unit.

12. The system of claim 10 wherein said code generation framework determines, based on the first and second loaded configuration data, corresponding code generation tasks for the first and second generation units.

13. The system of claim 8 further comprising a first adapter configured between the first declarative development environment and the first code generator core and a second adapter configured between the second declarative development environment and the second code generator core, wherein the first adapter serves as an interface between the first declarative development environment and the first code generator core and the second adapter serves as an interface between the second declarative development environment and the second code generator core.

14. The system of claim 8 wherein the code generator framework produces the first code to the first code generator core from the first code generation technology as a plurality of files for compilation by a first target runtime system, and wherein the code generator framework produces the second code to the second code generator core from the second code generation technology as a plurality of files for compilation by a second target runtime system.

* * * * *